(12) United States Patent
Gu et al.

(10) Patent No.: US 9,510,019 B2
(45) Date of Patent: Nov. 29, 2016

(54) TWO-STEP QUANTIZATION AND CODING METHOD AND APPARATUS

(75) Inventors: Qunshan Gu, Hayward, CA (US); Yaowu Xu, Santa Clara, CA (US)

(73) Assignee: GOOGLE INC., Mountain View, CA (US)

( * ) Notice: Subject to any disclaimer, the term of this patent is extended or adjusted under 35 U.S.C. 154(b) by 835 days.

(21) Appl. No.: 13/570,492

(22) Filed: Aug. 9, 2012

(65) Prior Publication Data
US 2014/0044164 A1  Feb. 13, 2014

(51) Int. Cl.
| | |
|---|---|
| H04N 7/12 | (2006.01) |
| H04N 19/85 | (2014.01) |
| H04N 19/176 | (2014.01) |
| H04N 19/30 | (2014.01) |
| H04N 19/134 | (2014.01) |
| H04N 19/12 | (2014.01) |
| H04N 19/182 | (2014.01) |

(52) U.S. Cl.
CPC ............. *H04N 19/85* (2014.11); *H04N 19/12* (2014.11); *H04N 19/134* (2014.11); *H04N 19/176* (2014.11); *H04N 19/182* (2014.11); *H04N 19/30* (2014.11)

(58) Field of Classification Search
CPC ............................ H04N 19/176; H04N 19/30
USPC ...................................................... 375/240.03
See application file for complete search history.

(56) References Cited

U.S. PATENT DOCUMENTS

| | | | |
|---|---|---|---|
| 5,590,329 A | 12/1996 | Goodnow, II et al. | |
| 5,644,709 A | 7/1997 | Austin | |
| 5,751,846 A | 5/1998 | Higgins-Luthman et al. | |
| 5,754,742 A | 5/1998 | Astle | |
| 5,912,676 A | 6/1999 | Malladi et al. | |
| 5,946,486 A | 8/1999 | Pekowski | |

(Continued)

FOREIGN PATENT DOCUMENTS

| | | |
|---|---|---|
| CA | 2815985 | 6/2012 |
| EP | 1605403 | 12/2005 |

(Continued)

OTHER PUBLICATIONS

Schrieber W.F.; "Advanced Television Systems for Terrestrial Broadcasting: Some Problems and Some Proposed Solutions", Proceedings of the IEEE, IEEE New York, US, vol. 83, No. 6, Jun. 1, 1995, pp. 958-981.

(Continued)

*Primary Examiner* — Jamie Atala
*Assistant Examiner* — Nguyen Truong
(74) *Attorney, Agent, or Firm* — Young Basile Hanlon & MacFarlane, P.C.

(57) ABSTRACT

Encoding and decoding a video image having a plurality of frames using a two-step quantization and coding process are disclosed. A block of a frame are encoded by identifying pixels having certain spatial characteristics, forming a second block from the block while replacing the identified pixels with a single pixel value, such as an average of the remaining original pixels. The second block is encoded, such as by transformation and quantization, and placed into a bitstream. The second block is decoded and subtracted from the original block to generate a difference block. The difference block is encoded, such as by quantization, and is placed in the bitstream. At a decoder, both blocks are decoded and combined to reconstruct the original block.

18 Claims, 12 Drawing Sheets

(56) References Cited

U.S. PATENT DOCUMENTS

| | | |
|---|---|---|
| 6,028,967 A | 2/2000 | Kim et al. |
| 6,085,029 A | 7/2000 | Kolawa et al. |
| 6,128,346 A | 10/2000 | Suarez et al. |
| 6,243,416 B1 | 6/2001 | Matsushiro et al. |
| 6,263,114 B1 | 7/2001 | Saunders |
| 6,363,119 B1 | 3/2002 | Oami |
| 6,434,197 B1 | 8/2002 | Wang et al. |
| 6,473,460 B1 | 10/2002 | Topper |
| 6,532,306 B1 | 3/2003 | Boon et al. |
| 6,542,990 B1 | 4/2003 | Tremblay et al. |
| 6,658,157 B1 | 12/2003 | Satoh et al. |
| 6,681,299 B1 | 1/2004 | Shimamura et al. |
| 6,687,304 B1 | 2/2004 | Peng |
| 6,700,809 B1 | 3/2004 | Ng et al. |
| 6,944,226 B1 | 9/2005 | Lin et al. |
| 7,114,104 B1 | 9/2006 | Bennett |
| 7,185,125 B2 | 2/2007 | Rougnon-Glasson |
| 7,216,135 B2 | 5/2007 | Sawdon et al. |
| 7,218,674 B2 | 5/2007 | Kuo |
| 7,236,527 B2 | 6/2007 | Ohira |
| 7,263,125 B2 | 8/2007 | Lainema |
| 7,450,642 B2 | 11/2008 | Youn |
| 7,457,362 B2 | 11/2008 | Sankaran |
| 7,487,314 B1 | 2/2009 | Agesen et al. |
| 7,681,077 B1 | 3/2010 | Eitzmann et al. |
| 7,734,893 B2 | 6/2010 | Hattori et al. |
| 7,768,515 B1 | 8/2010 | Eitzmann et al. |
| 7,836,434 B1 | 11/2010 | Boucher |
| 7,856,538 B2 | 12/2010 | Speirs, II et al. |
| 8,055,864 B2 | 11/2011 | Sawdon et al. |
| 8,311,111 B2 | 11/2012 | Xu et al. |
| 8,325,796 B2 | 12/2012 | Wilkins et al. |
| 8,526,498 B2 | 9/2013 | Lim et al. |
| 8,666,181 B2 | 3/2014 | Venkatapuram et al. |
| 8,711,935 B2 | 4/2014 | Kim et al. |
| 8,724,702 B1 | 5/2014 | Bulusu et al. |
| 8,761,242 B2 | 6/2014 | Jeon et al. |
| 8,891,616 B1 | 11/2014 | Wilkins |
| 2003/0053541 A1 | 3/2003 | Sun et al. |
| 2003/0072364 A1 | 4/2003 | Kim et al. |
| 2003/0140238 A1 | 7/2003 | Turkboylari |
| 2004/0114568 A1 | 6/2004 | Beverly |
| 2005/0002454 A1 | 1/2005 | Ueno et al. |
| 2005/0046702 A1 | 3/2005 | Katayama et al. |
| 2005/0084007 A1 | 4/2005 | Lightstone et al. |
| 2005/0206785 A1 | 9/2005 | Swan et al. |
| 2005/0249279 A1 | 11/2005 | Kondo et al. |
| 2005/0265447 A1 | 12/2005 | Park |
| 2005/0283770 A1 | 12/2005 | Karp et al. |
| 2006/0171457 A1 | 8/2006 | DeGarrido et al. |
| 2006/0277371 A1 | 12/2006 | Cohn et al. |
| 2007/0065026 A1 | 3/2007 | Lee et al. |
| 2007/0110290 A1 | 5/2007 | Chang et al. |
| 2007/0121731 A1 | 5/2007 | Tanizawa et al. |
| 2007/0156986 A1 | 7/2007 | Neiger et al. |
| 2007/0201559 A1 | 8/2007 | He |
| 2007/0268964 A1 | 11/2007 | Zhao |
| 2008/0013844 A1 | 1/2008 | Hu |
| 2008/0170793 A1 | 7/2008 | Yamada et al. |
| 2008/0225947 A1 | 9/2008 | Narroschke et al. |
| 2008/0240250 A1 | 10/2008 | Lin et al. |
| 2009/0010559 A1 | 1/2009 | Inagaki |
| 2009/0043978 A1 | 2/2009 | Sawdon et al. |
| 2010/0086028 A1 | 4/2010 | Tanizawa et al. |
| 2010/0091842 A1 | 4/2010 | Ikeda et al. |
| 2010/0104021 A1 | 4/2010 | Schmit |
| 2010/0118945 A1 | 5/2010 | Wada et al. |
| 2010/0128796 A1 | 5/2010 | Choudhury |
| 2010/0166061 A1 | 7/2010 | Kondo et al. |
| 2010/0177819 A1 | 7/2010 | Jeon et al. |
| 2010/0257511 A1 | 10/2010 | Hatabu |
| 2010/0260268 A1 | 10/2010 | Cowan et al. |
| 2010/0322306 A1 | 12/2010 | Au et al. |
| 2011/0026591 A1 | 2/2011 | Bauza et al. |
| 2011/0038410 A1 | 2/2011 | Narroschke et al. |
| 2011/0082962 A1 | 4/2011 | Horovitz et al. |
| 2011/0173505 A1 | 7/2011 | Bae et al. |
| 2011/0235706 A1 | 9/2011 | Demircin et al. |
| 2011/0293001 A1 | 12/2011 | Lim et al. |
| 2011/0304634 A1 | 12/2011 | Urbach |
| 2012/0045128 A1* | 2/2012 | Bae .................. G06K 9/469 382/173 |
| 2012/0114034 A1 | 5/2012 | Huang et al. |
| 2012/0140815 A1 | 6/2012 | Zhou et al. |
| 2012/0170647 A1 | 7/2012 | He et al. |
| 2012/0189052 A1 | 7/2012 | Karczewicz et al. |
| 2012/0278665 A1 | 11/2012 | Serebryany et al. |
| 2012/0314760 A1 | 12/2012 | He |
| 2013/0022108 A1 | 1/2013 | Panusopone et al. |
| 2013/0051457 A1 | 2/2013 | Joshi et al. |

FOREIGN PATENT DOCUMENTS

| | | |
|---|---|---|
| EP | 1605403 A1 | 12/2005 |
| EP | 2048887 | 4/2009 |
| EP | 2048887 A1 | 4/2009 |
| KR | 20130086012 A | 7/2013 |
| WO | 03021969 A2 | 3/2003 |
| WO | WO2012102867 | 8/2012 |
| WO | WO2013032576 | 3/2013 |

OTHER PUBLICATIONS

Shimono et al.; "Transform Image Coding With Edge Compensation", Electronics and Communications in Japan, Part I: Communications, Hoboken, NJ, US, vol. 74, No. 10, Oct. 1, 1991, pp. 49-56.

Price, Thomas B.; "Muscle and Liver Carbohydrates: Response to Military Task Performance by Women and Men", Oct. 1, 1997, http://www.dtic.mil/docs/citations/ADA337501, p. 10.

Arbeiter, J. H. et al.; "A Two-Dimensional Real-Time Video Pyramid Processor", RCA Review, RCA Corp. Princeton, US, vol. 47, No. 1, Mar. 1, 1986, pp. 3-31.

Chee, Y-K.; "Survey of Progressive Image Transmission Methods", International Journal of Imaging Systems and Technology, Wiley and Sons, New York, US, vol. 10, No. 1, Jan. 1, 1999, pp. 3-19.

International Search Report and Written Opinion dated Oct. 25, 2013, in co-pending International Application No. PCT/US2013/054311.

International Preliminary Report and Written Opinion for PCT/US2013054311, mailed Feb. 10, 2015, 12 pages.

Schrieber W. F.: Advanced Television Systems for Terrestrial Broadcasting: Some Proposed Solutions, IEEE vol. 83, No. 6 , Jun. 1, 1995 pp. 958-981.

"Series H: Audiovisual and Multimedia Systems; Infrastructure of audiovisual services—Coding of moving video; Advanced video coding for generic audiovisual services". H.264. Version 1. International Telecommunication Union. Dated May, 2003.

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced

(56) References Cited

OTHER PUBLICATIONS video coding for generic audiovisual services. Version 8. International Telecommunication Union. Dated Nov. 1, 2007.
"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.
"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.
"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.
"VP8 Data Format and Decoding Guide". WebM Project. Google On2. Dated: Dec. 1, 2010.
Bankoski et al. "VP8 Data Format and Decoding Guide; draft-bankoski-vp8-bitstream-02" Network Working Group. Dated May 18, 2011.
Bankoski et al. "Technical Overview of VP8, an Open Source Video Codec for the Web". Dated Jul. 11, 2011.
Bankoski, J., Koleszar, J., Quillio, L., Salonen, J., Wilkins, P., and Y. Xu, "VP8 Data Format and Decoding Guide", RFC 6386, Nov. 2011.
Mozilla, "Introduction to Video Coding Part 1: Transform Coding", Video Compression Overview, Mar. 2012, 171 pp.
ISR and Written Opinion mailed Jul. 16, 2012, for PCT/US2012/034635 (13 pp).
Zhao, Qin, et al.; "Efficient Memory Shadowing for 64-bit Architectures", Procedings of the 2010 International Symposium of Memory Management, Jun. 5, 2010, pp. 93-102.
Aoki et al., "Prediction-Based QP Derivation", Joint Collaborative Team on Video Coding (JCT-VC) of ITU-T SG16 WP3 and ISO/IEC JTC1/SC29/WG11 5th Meeting: Geneva, CH, Mar. 16-23, 2011.
Bross et al., "High-Efficiency Video Coding", Joint Collaborative Team on Video Coding (JCT-VC) JCTVCF803 of ITU-T SG16 WP3 and ISO/IEC JTC1/SC29/WG11 6th Meeting: Torino, IT Jul. 14-22, 2011.
Bross, Benjamin et al.: "High Efficiency Video Coding (HEVC) text specification draft 8," Joint Collaborative Team on Video Coding(JCT-VC) of ISO/IEC JTC1/SC29/WG11 and ITU-T SG16 WP3, document JCTVC-J1003_d7, 10th Meeting : Stockholm, SE, Jul. 11-20, 2012, all pages.
Chuang et al., AHG Quantization: Sub-LCU Delta QP, Joint Collaborative Team on Video Coding(JCT-VC) of ITU-T SG16 WP3 and ISO/IEC JTC1/SC29/WG11 5th Meeting: Geneva,CH, Mar. 16-23, 2011.
Coban et al., CU-Level QP Prediction, Joint Collaborative Team on Video Coding (JCT-VC) of ITU-T SG16 WP3 and ISO/IEC JTC1/SC29/WG11 5th Meeting: Geneva, Ch, Mar. 16-23, 2011.
Flynn D et al.: "Transform Skipping in the presence of Scaling Lists", 101 MPEG Meeting; Jul. 16-Jul. 20, 2012; Stockholm; (Motion picture Expert Group or ISO/IEC JTC1/ZSC29/WG11), No. m25414, Jul. 5, 2012, all pages.
ISR, "ISR Search Report and Written Opinion of the International Searching Authority" for International Application No. ISR/US2013/058376 (CS40854) dated Nov. 22, 2013, 12 pages.
Wiegand et al., "WD2: Working Draft 2 of High-Efficiency Video Coding," JCTVC-D503, Jan. 2011.
Kobayashi M et al.; "Sub-LCU Level delta QP signaling", 96.MPEG Meeting Mar. 21-Mar. 25, 2011; Geneva; (Motion Picture Expert Group or ISO/IEC JTC1/SC29/WG11), No. m19716, Mar. 17, 2011, all pages.
L Dong et al.: "CU Adaptive Quantization Syntax Change for Better Decoder pipelining", Joint Collaborative Team on Video Coding (JCT-VC) of ITU-T SG16 WP3 ans ISO/IEC JTC1/SC29/WG11, vol. JCTVC-D258, Jan. 15, 2011, all pages.
Pang et al.,"Improved DPQ Calculation Method", Joint Collaborative Team on Video Coding (JTC-VC) of ITU-T SG16 WP3 and ISO/IEC JTC1/SC29/WG11 5th Meeting: Geneva, CH, Mar. 16-23, 2011.
Shima et al., "Support for Sub-LCU-Level QP in HEVC", Joint Collaborative Team on Video Coding (JCT-VC) of ITU-T SG16 WP3 and ISO/IEC JTC1/SC29/WG11 %th Meeting: Geneva, CH, Mar. 16-23, 2011.
Thomas Wiegand; "Working Draft No. 2, Revision 2 (WD-2) H.26L", 2. JVT Meeting; Jan. 29-Feb. 1, 2002; Geneva, CH; (Joint Video Team of ISO/IEC JTC1/SC29/WG11 and ITU-T SG.16), No. JVT-18r2, Feb. 1, 2002, all pages.
Cassidy, An analysis of VP8, a new video codec for the web, 148 pages. Nov. 2011.
Jun-Ren Ding et al.; "Two-Layer and adaptive entropy coding algorithms for H. 264-based lossless image coding", Acoustics, Speech and Signal Processing, 2008. ICASSP 2008. IEE International conference on IEEE, Piscatawa, NJ, USA Mar. 31, 2008.
Pai, et al., MPEG 4 constant quality constant bit rate control algorithms, signal processing:image communication, Jan. 2005, vol. 21, Issue 1, pp. 67-89.
Park, Jun Sung, et al., "Selective Intra Prediction Mode Decision for H.264/AVC Encoders", World Academy of Science, Engineering and Technology 13, (2006).
Schwarz H. et al.: "SNR-scalable extension of H.264/AVC" , Image Processing, 2004. ICIP 2004 International Conference on Singapore Oct. 24-27, 2004.
International Search Report Application No. PCT/US2013/063722 mailed on Dec. 9, 2013.

* cited by examiner

*1004*

| 286.0000 | 99.5877 | 43.9352 | 37.2921 | 29.2500 | 20.0724 | 12.6496 | 6.3290 |
| 78.8673 | 66.4119 | 60.2978 | 49.7964 | 38.3010 | 26.9309 | 16.3735 | 7.9139 |
| 42.2527 | 57.5797 | 52.0076 | 42.7328 | 32.7801 | 23.0195 | 13.0852 | 6.7622 |
| 33.3180 | 44.9855 | 40.9211 | 32.7096 | 24.5452 | 16.2273 | 10.2934 | 4.8141 |
| 24.0000 | 32.0062 | 27.6031 | 22.3589 | 16.2500 | 10.1548 | 5.8847 | 3.0309 |
| 14.0259 | 19.6323 | 16.4579 | 13.4721 | 8.9718 | 5.1205 | 2.3693 | 1.1428 |
| 7.9346 | 10.6550 | 8.8352 | 6.6634 | 4.0109 | 1.7000 | 0.7424 | -0.2139 |
| 3.2980 | 4.6587 | 3.2374 | 2.4119 | 1.6812 | 0.3501 | -0.3702 | 99.7581 |

*1002*

| 255 | 71 | 45 | 33 | 40 | 27 | 32 | 27 |
| 92 | 51 | 29 | 51 | 20 | 42 | 21 | 30 |
| 47 | 30 | 56 | 16 | 53 | 12 | 38 | 21 |
| 36 | 53 | 17 | 58 | 8 | 7 | 48 | 11 | 28 |
| 44 | 24 | 56 | 6 | 53 | 5 | 36 | 17 |
| 33 | 47 | 16 | 50 | 6 | 41 | 9 | 24 |
| 38 | 26 | 43 | 15 | 39 | 10 | 27 | 15 |
| 34 | 36 | 27 | 33 | 20 | 25 | 16 | 18 |

*1006*

| 0 | 0 | 0 | 0 | 0 | 0 | 0 | 3 |
| 0 | 1 | 0 | 0 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 2 | 1 | 1 | 1 | 0 | 0 | 0 |
| 1 | 2 | 2 | 1 | 1 | 0 | 0 | 0 |
| 3 | 2 | 2 | 1 | 1 | 0 | 0 | 0 |
| 9 | 2 | 1 | 1 | 1 | 0 | 0 | 0 |

*FIG. 10*

TWO-STEP QUANTIZATION AND CODING METHOD AND APPARATUS

TECHNICAL FIELD

The present disclosure relates in general to video encoding and decoding using quantization.

BACKGROUND

An increasing number of applications today make use of digital video for various purposes including, for example, remote business meetings via video conferencing, high definition video entertainment, video advertisements, and sharing of user-generated videos. As technology is evolving, users have higher expectations for video quality and expect high resolution video with smooth playback.

Digital video streams typically represent video using a sequence of frames. Each frame can include a number of blocks, which in turn may contain information describing the value of color, brightness or other attributes for pixels. The amount of data in a typical video stream is large, and transmission and storage of video can use significant computing or communications resources. Various techniques have been proposed to reduce the amount of data in video streams, including compression and other encoding techniques. These techniques in some cases encode the video stream using parameters or values that vary for different segments of blocks within frames.

SUMMARY

Disclosed herein are implementations of systems, methods and apparatuses for coding a video signal using a two-step quantization process. One aspect of the disclosed implementations is a method for encoding a frame in a video stream with a computing device, the frame having a plurality of blocks. The method includes identifying a first block of the plurality of blocks, generating a second block from the first block such that the second block has lower entropy than the first block, encoding the second block using a first encoding technique, wherein the first encoding technique is lossy, decoding the encoded second block, generating a third block based on a difference between the decoded second block and the first block, and encoding the third block using a second encoding technique different from the first encoding technique. Disclosed aspects also include generating an encoded video bitstream using the encoded second and third data blocks.

Another aspect of the disclosed implementations is a method for decoding a frame of an encoded video bitstream including a plurality of encoded blocks and the frame having a plurality of blocks. The method includes receiving a first encoded block and a second encoded block of the plurality of encoded blocks, decoding the first encoded block using a first decoding technique to generate a first decoded block, decoding the second encoded block using a second decoding technique different from the first decoding technique to generate a second decoded block, the second decoded block having a lower entropy than the first decoded block, and combining the first decoded block with the second decoded block to form a block of the plurality of blocks.

Another aspect of the disclosed implementations is an apparatus for encoding a frame in a video stream, the frame having a plurality of blocks. The apparatus includes a memory and a processor configured to execute instructions stored in the memory to identify a first block of the plurality of blocks, generate a second block from the first block such that the second block has a lower entropy than the first block, encode the second block using a first encoding technique, wherein the first encoding technique is lossy; decode the encoded second block, generate a third block based on the difference between the decoded second block and the first block, and encode the third block using a second encoding technique different from the first encoding technique.

Variations in these aspects and other implementations are described in additional detail below.

BRIEF DESCRIPTION OF THE DRAWINGS

The description herein makes reference to the accompanying drawings wherein like reference numerals refer to like parts throughout the several views, and wherein:

FIG. 10 is a diagram of another example of an 8×8 block of pixels in the spatial domain transformed into a two-dimensional matrix of transform coefficients using a DCT transform, where the matrix is further quantized.

DETAILED DESCRIPTION

Figure 1:
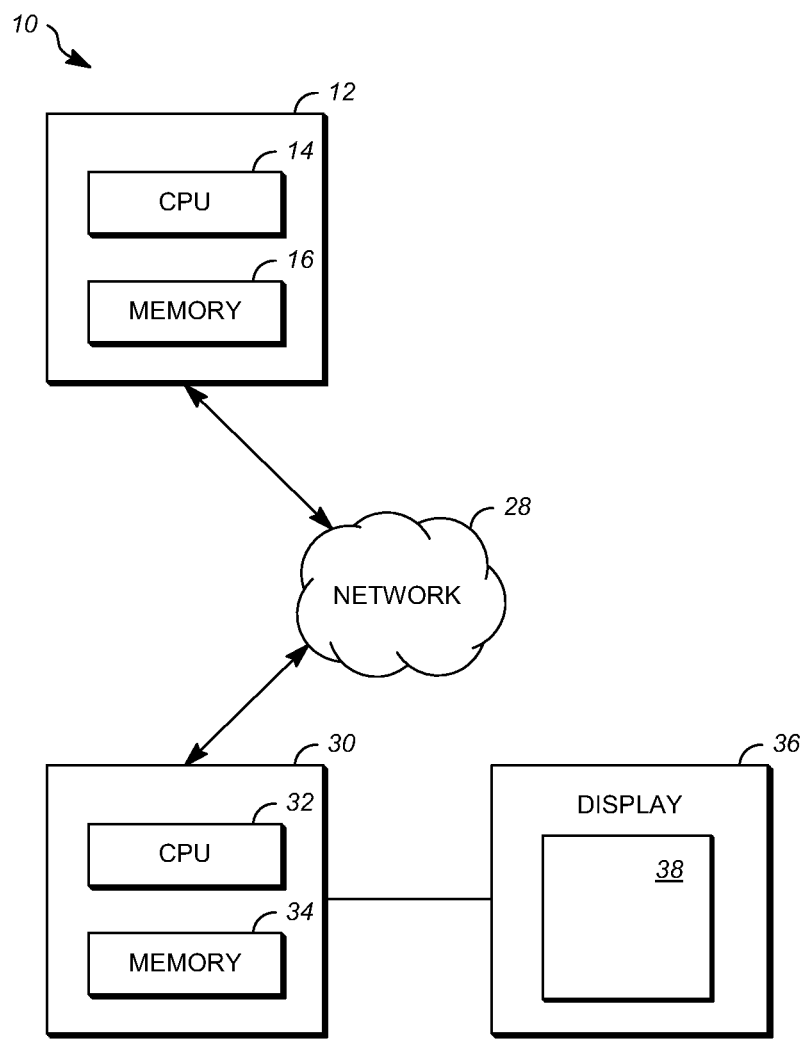
FIG. 1 is a schematic of a video encoding and decoding system.

Digital video is used for various purposes including, for example, remote business meetings via video conferencing, high definition video entertainment, video advertisements, and sharing of user-generated videos. As technology evolves, users have higher expectations for video quality and expect high resolution video even when transmitted over communications channels having limited bandwidth.

To permit transmission of digital video streams while limiting bandwidth consumption, video encoding and decoding implementations incorporate various compression schemes. These compression schemes generally break the image up into blocks and use one or more techniques to limit the amount of information included in a resulting digital video bitstream for transmission. The bitstream, once received, is then decoded to re-create the blocks and the source images from the limited information.

According to one example, block-based transform domain quantization and coding can be used for compression due to the energy compact coefficient distribution in the transform domain. This compactness is based on the assumption that the data in the spatial domain is mostly DC values with slow changes. This may not be true, however, especially after motion prediction or intra directional prediction. The spectrum of the spatial fine details, small objects and/or isolated features can be spread into a wide area of the spectrum. Due to quantization, these fine features can be heavily distorted or even destroyed. The data block transformed into frequency domain thus may not be the best form for representation and coding. Instead, the spatial domain can often be suitable for representation and coding of small and isolated objects and fine features.

Teachings herein can combine transform and spatial domain representations of data blocks to provide improved compression encoding. For example, an input block can be re-formed into two separate blocks: one containing mostly low frequency components and one containing high frequency components. The high frequency components can be represented by spikes or isolated pixels that exceed the average value of the block by a predetermined amount. Isolated pixels can be replaced in the block by the average value. This re-formed block can be subtracted from the original block to form a difference block. The re-formed block can be encoded using a first coding technique, while the difference block can be encoded using a second coding technique. Both encoded blocks are then fed into a bitstream.

Decoding an encoded video bitstream encoded in this fashion can be performed by reversing some of the steps of the encoding process. Two-step encoding can be indicated to the decoder by modifying the bitstream syntax with bits set in the frame, slice or block headers as described in additional detail below. Upon receiving blocks of a video stream encoded using a two-step process, the decoder decodes the blocks using decoding processing appropriate to each block. The blocks can then be added together to form a representation of the original block.

Additional details of these implementations are described below, initially with reference to systems in which they can be incorporated.

FIG. 1 is a schematic of a video encoding and decoding system 10. An exemplary transmitting station 12 can be, for example, a computer having an internal configuration of hardware including a processor such as a central processing unit (CPU) 14 and a memory 16. CPU 14 is a controller for controlling the operations of transmitting station 12. CPU 14 can be connected to memory 16 by, for example, a memory bus. Memory 16 can be read only memory (ROM), random access memory (RAM) or any other suitable memory device. Memory 16 can store data and program instructions that are used by CPU 14. Other suitable implementations of transmitting station 12 are possible. For example, the processing of transmitting station 12 can be distributed among multiple devices.

A network 28 connects transmitting station 12 and a receiving station 30 for encoding and decoding of the video stream. Specifically, the video stream can be encoded in transmitting station 12 and the encoded video stream can be decoded in receiving station 30. Network 28 can be, for example, the Internet. Network 28 can also be a local area network (LAN), wide area network (WAN), virtual private network (VPN), a cellular telephone network, or any other means of transferring the video stream from transmitting station 12 to, in this example, receiving station 30.

Receiving station 30, in one example, can be a computer having an internal configuration of hardware including a processor such as a CPU 32 and a memory 34. CPU 32 is a controller for controlling the operations of receiving station 30. CPU 32 can be connected to memory 34 by, for example, a memory bus. Memory 34 can be ROM, RAM or any other suitable memory device. Memory 34 can store data and program instructions that are used by CPU 32. Other suitable implementations of receiving station 30 are possible. For example, the processing of receiving station 30 can be distributed among multiple devices.

A display 36 configured to display a video stream can be connected to receiving station 30. Display 36 can be implemented in various ways, including by a liquid crystal display (LCD) or a cathode-ray tube (CRT) or a light emitting diode display (LED), such as an OLED display. Display 36 is connected to CPU 32 and can be configured to display a rendering 38 of the video stream decoded by a decoder in receiving station 30.

Other implementations of encoder and decoder system 10 are possible. In the implementations described, for example, an encoder is in transmitting station 12 and a decoder is in receiving station 30 as instructions in memory or a component separate from memory. However, an encoder or decoder can be connected to a respective station 12, 30 rather than in it. Further, one implementation can omit network 28 and/or display 36. In another implementation, a video stream can be encoded and then stored for transmission at a later time to receiving station 30 or any other device having memory. In one implementation, a video stream is received by the receiving station 30 (e.g., via network 28, a computer bus, and/or some communication pathway) and stored for later decoding. In another implementation, additional components can be added to encoder and decoder system 10. For example, a display or a video camera can be attached to transmitting station 12 to capture the video stream to be encoded. In an exemplary implementation, a real-time transport protocol (RTP) is used for transmission. In another implementation, a transport protocol other than RTP may be used, e.g. an HTTP-based video streaming protocol.

Figure 2:
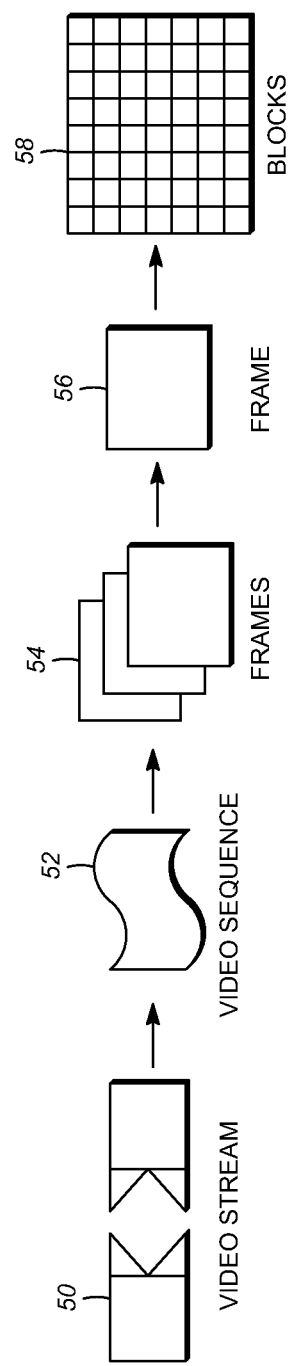
FIG. 2 is a diagram of a typical video stream to be encoded and decoded.

FIG. 2 is a diagram of a typical video stream 50 to be encoded and decoded. Video stream 50 includes a video sequence 52. At the next level, video sequence 52 includes a number of adjacent frames 54. While three frames are illustrated as adjacent frames 54, video sequence 52 can include any number of adjacent frames. Adjacent frames 54 can then be further subdivided into individual frames, e.g., a single frame 56. At the next level, single frame 56 can be divided into a series of blocks 58, which can contain data corresponding to, for example, 16×16 pixels in frame 56. Each block can contain luminance and chrominance data for the corresponding pixels. Blocks 58 can also be of any other suitable size such as 16×8 pixel groups or 8×16 pixel groups and can be further subdivided into smaller blocks depending on the application. Unless otherwise noted, the terms block and macroblock are used interchangeably herein.

Figure 3:
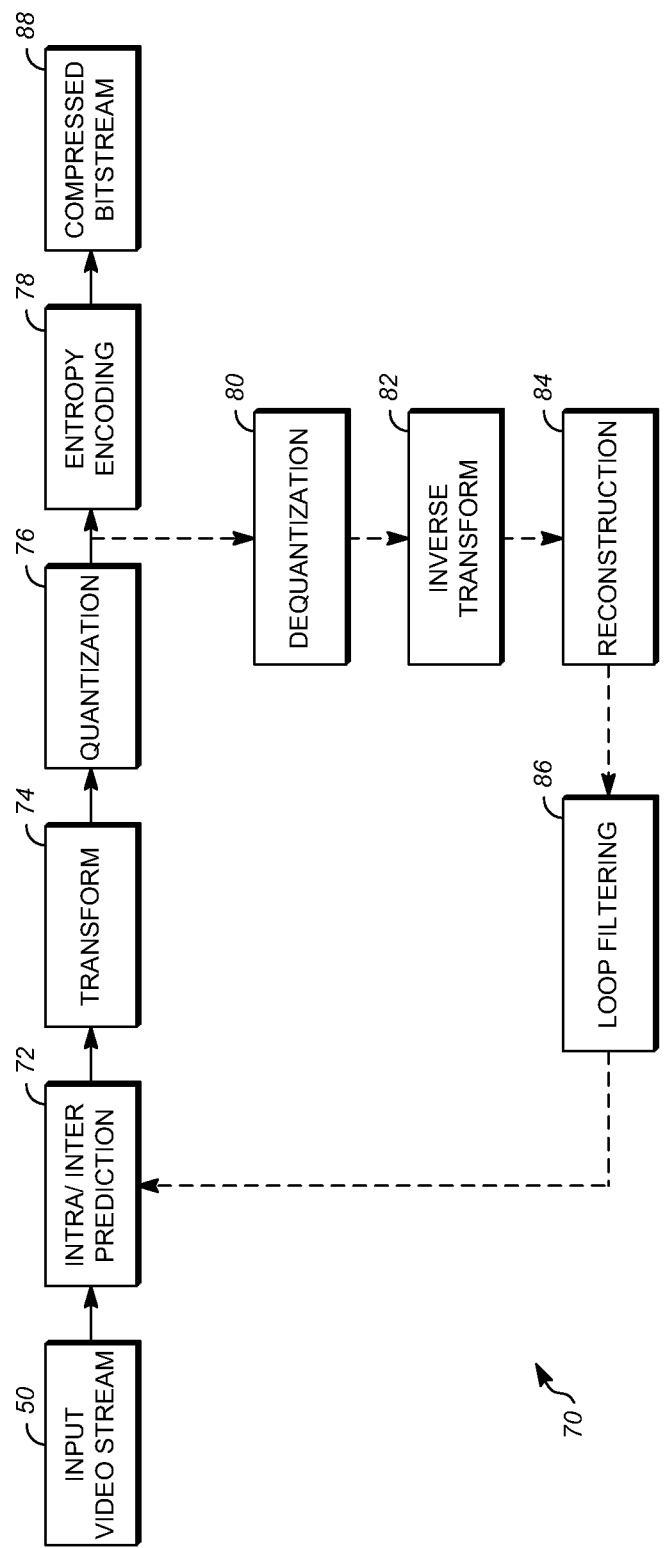
FIG. 3 is a block diagram of a video compression system in accordance with a disclosed implementation.

FIG. 3 is a block diagram of an encoder 70 in accordance with one implementation. Encoder 70 can be implemented, as described above, in transmitting station 12 such as by providing a computer software program stored in memory 16, for example. The computer software program can include machine instructions that, when executed by CPU 14, cause transmitting station 12 to encode video data in the manner described in FIG. 3. Encoder 70 can also be implemented as specialized hardware included, for example, in transmitting station 12. Encoder 70 encodes input video stream 50. Encoder 70 has the following stages to perform the various functions in a forward path (shown by the solid connection lines) to produce an encoded or a compressed bitstream 88: an intra/inter prediction stage 72, a transform stage 74, a quantization stage 76, and an entropy encoding stage 78. Encoder 70 may also include a reconstruction path (shown by the dotted connection lines) to reconstruct a frame for prediction and encoding of future blocks. In FIG. 3, encoder 70 has the following stages to perform the various functions in the reconstruction path: a dequantization stage 80, an inverse transform stage 82, a reconstruction stage 84, and a loop filtering stage 86. Other structural variations of encoder 70 can be used to encode video stream 50. As used herein the term compressed bitstream is synonymous with the term encoded video stream and the terms will be used interchangeably.

When video stream 50 is presented for encoding, each frame 56 within video stream 50 is processed in units of blocks. At intra/inter prediction stage 72, each block can be encoded using either intra-frame prediction (i.e., within a single frame) or inter-frame prediction (i.e., from frame to frame). In either case, a prediction block can be formed. In the case of intra-prediction, a prediction block can be formed from samples in the current frame that have been previously encoded and reconstructed. In the case of inter-prediction, a prediction block can be formed from samples in one or more previously constructed reference frames.

Next, still referring to FIG. 3, the prediction block can be subtracted from the current block at intra/inter prediction stage 72 to produce a residual block (residual). Transform stage 74 transforms the residual into transform coefficients in, for example, the frequency domain. Examples of block-based transforms include the Karhunen-Loève Transform (KLT), the Discrete Cosine Transform (DCT), the Singular Value Decomposition Transform (SVD) and Wavelet Transformation. In one example, the DCT transforms the block into the frequency domain. In the case of DCT, the transform coefficient values are based on spatial frequency, with the lowest frequency (DC) coefficient at the top-left of the matrix and the highest frequency coefficient at the bottom-right of the matrix. Transform stage 74 can also perform a null transformation, in which the input data is not changed, or perform pulse code modulation, which does not transform the data into transform coefficients, but can encode the input residual block by re-ordering the pixels in rank order and subtracting successive pixels in order to reduce the number of bits to be included in the compressed bitstream.

Quantization stage 76 converts the transform coefficients into discrete quantum values, which are referred to as quantized transform coefficients. The quantized transform coefficients are then entropy encoded by entropy encoding stage 78. The entropy-encoded coefficients, together with other information used to decode the block, such as the type of prediction used, motion vectors and quantizer value, are then output to compressed bitstream 88. Compressed bitstream 88 can be formatted using various techniques, such as variable length encoding (VLC) and arithmetic coding.

The reconstruction path in FIG. 3 (shown by the dotted connection lines) can be used to ensure that both encoder 70 and a decoder 100 (described below) use the same reference frames to decode compressed bitstream 88. The reconstruction path performs functions that are similar to functions that take place during the decoding process that are discussed in more detail below, including dequantizing the quantized transform coefficients at dequantization stage 80 and inverse transforming the dequantized transform coefficients at inverse transform stage 82 to produce a derivative residual block (derivative residual). At reconstruction stage 84, the prediction block that was predicted at intra/inter prediction stage 72 can be added to the derivative residual to create a reconstructed block. Loop filtering stage 86 can be applied to the reconstructed block to reduce distortion such as blocking artifacts.

Other variations of encoder 70 can be used to encode compressed bitstream 88. For example, a non-transform based encoder 70 can quantize the residual signal directly without transform stage 74. In another implementation, encoder 70 can have quantization stage 76 and dequantization stage 80 combined into a single stage.

Figure 4:
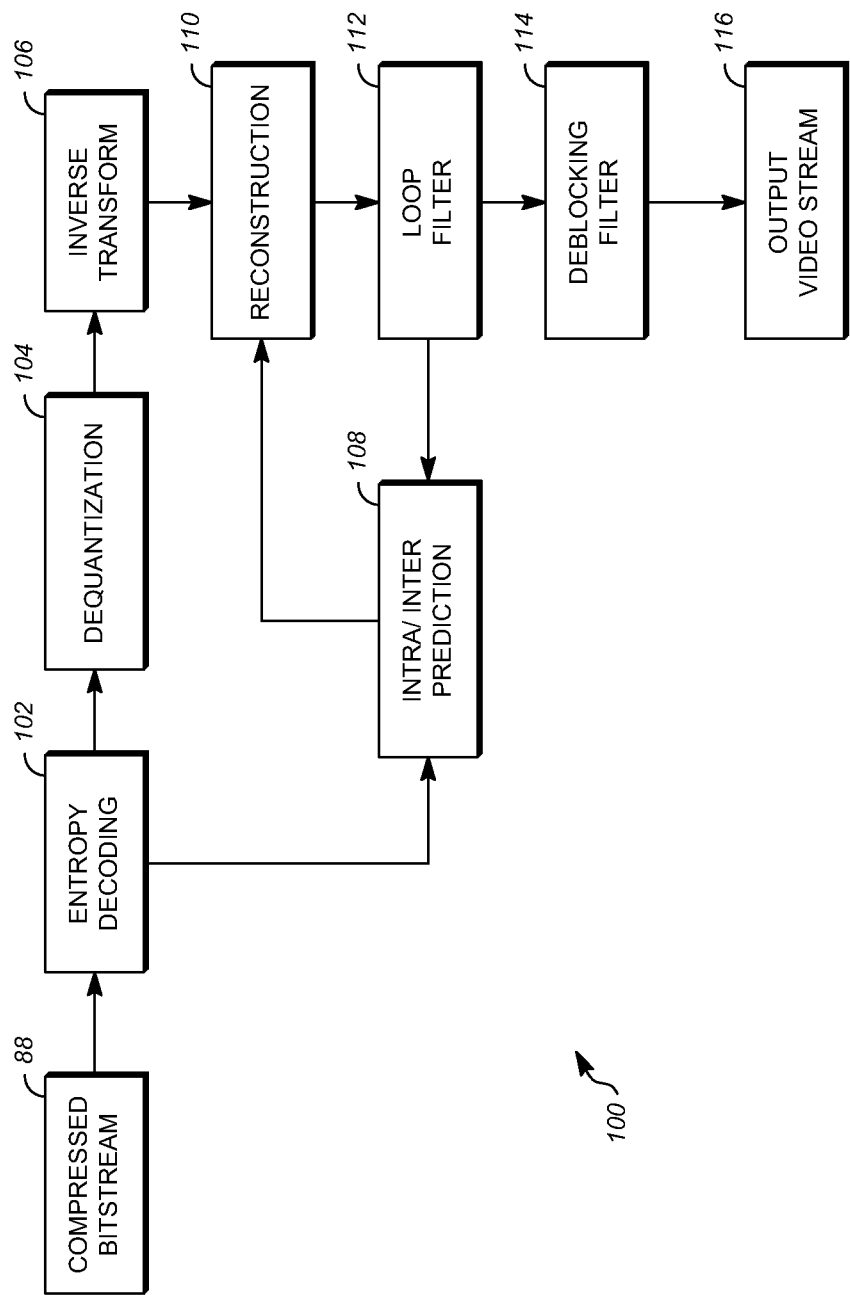
FIG. 4 is a block diagram of a video decompression system in accordance with another disclosed implementation.

FIG. 4 is a block diagram of a decoder 100 in accordance with another implementation of this disclosure. Decoder 100 can be implemented in receiving station 30 by, for example, providing a computer software program stored in memory 34. The computer software program can include machine instructions that, when executed by CPU 32, cause receiving station 30 to decode video data in the manner described in FIG. 4. Decoder 100 can also be implemented as specialized hardware included, for example, in transmitting station 12 or receiving station 30. Decoder 100, similar to the reconstruction path of encoder 70 discussed above, includes in one example the following stages to perform various functions to produce an output video stream 116 from compressed bitstream 88: an entropy decoding stage 102, a dequantization stage 104, an inverse transform stage 106, an intra/inter prediction stage 108, a reconstruction stage 110, a loop filtering stage 112 and a deblocking filtering stage 114. Other structural variations of decoder 100 can be used to decode compressed bitstream 88.

When compressed bitstream 88 is presented for decoding, the data elements within compressed bitstream 88 can be decoded by entropy decoding stage 102 to produce a set of quantized transform coefficients. Dequantization stage 104 dequantizes the quantized transform coefficients, and inverse transform stage 106 inverse transforms the dequantized transform coefficients to produce a derivative residual that can be identical to that created by reconstruction stage 84 in encoder 70. Using header information decoded from compressed bitstream 88, decoder 100 can use intra/inter prediction stage 108 to create the same prediction block as was created in encoder 70. At reconstruction stage 110, the prediction block can be added to the derivative residual to create a reconstructed block. Loop filtering stage 112 can be applied to the reconstructed block to reduce blocking artifacts. Deblocking filtering stage 114 can be applied to the reconstructed block to reduce blocking distortion, and the result is output as output video stream 116.

Other variations of decoder 100 can be used to decode compressed bitstream 88. For example, decoder 100 can produce output video stream 116 without deblocking filtering stage 114.

Figure 5:
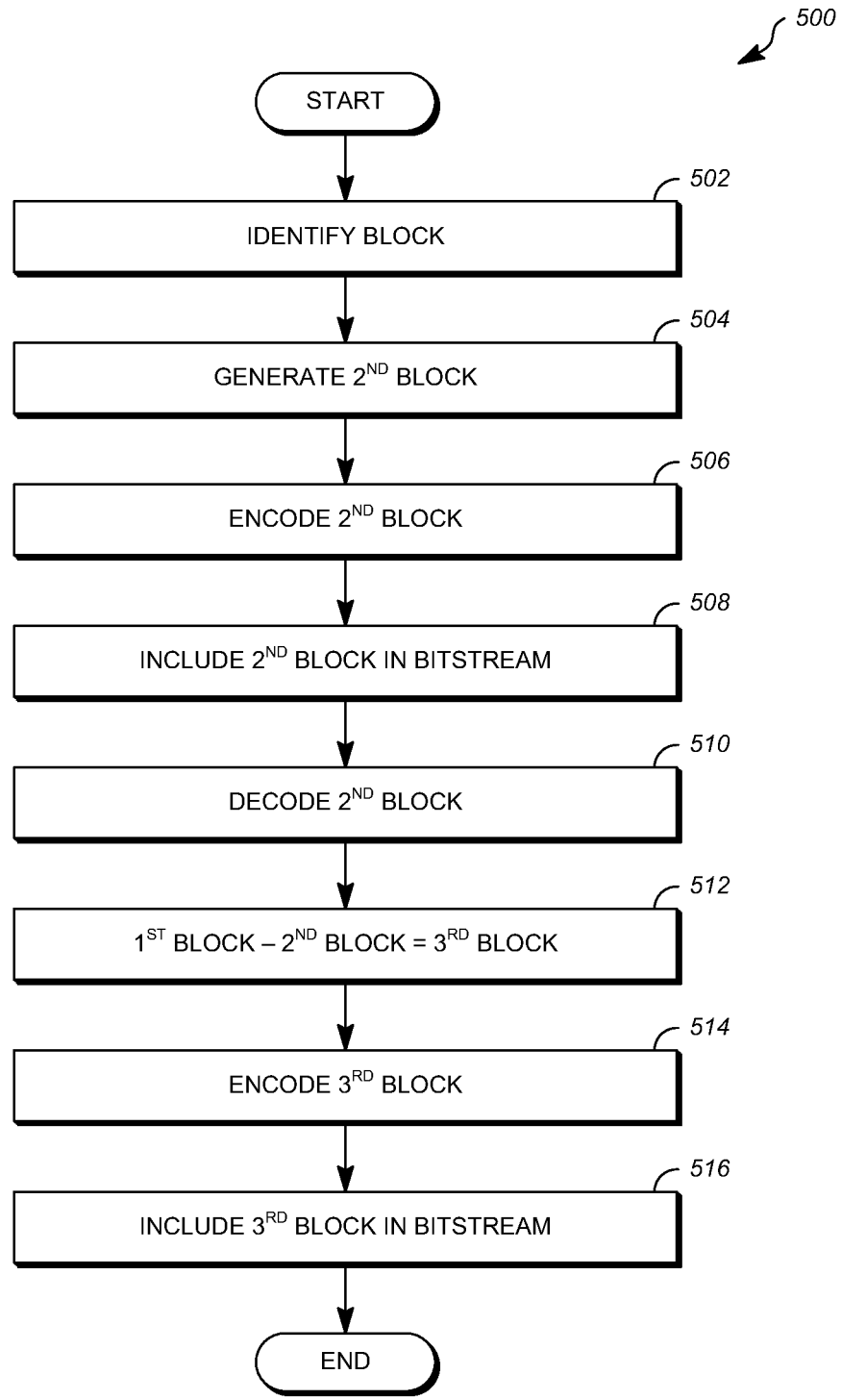
FIG. 5 is a flowchart of a process for encoding a video stream using a two-step process according to a disclosed implementation.

FIG. 5 is a flowchart of a process 500 for encoding a video stream using a two-step process according to an implementation. Further, for simplicity of explanation, process 500 is depicted and described as a series of steps. However, steps in accordance with this disclosure can occur in various orders and/or concurrently. For example, while in FIG. 5, the first block is included in the bitstream at step 508 before the second block is included in the bitstream at step 516, it shall be appreciated that blocks may be included the bitstream in other orders and remain within the scope of this disclosure. Additionally, steps in accordance with this disclosure may occur with other steps not presented and described herein.

Furthermore, not all illustrated steps may be required to implement a method in accordance with the disclosed subject matter.

Process 500 can be implemented as a software program by a computing device such as transmitting station 12. For example, the software program can include machine-readable instructions that are stored in memory 16 that, when executed by a processor such as CPU 14, can cause the computing device to operate on data stored in memory 14 and perform process 500. Process 500 can also be implemented using hardware. As explained above, some computing devices can have multiple memories and multiple processors, and the steps of process 500 can in such cases be distributed using different processors and memories. Use of the terms "processor" and "memory" in the singular herein encompasses computing devices that have only one processor or one memory as well as devices having multiple processors and memories that may be used in the performance of some but not necessarily all of the recited steps.

At step 502, a block of the video stream to be encoded is identified. As used in this disclosure, "identify" means to select, construct, determine, specify or otherwise identify in any manner whatsoever. Blocks of a frame or slice of the video stream can be identified or selected in raster scan order or any other order. At step 504, a second block is generated from the first block by extracting special features and values from the data block and replacing these data values with other data values that can make the transform domain coefficients simpler. As used herein the term "generating" can mean create, construct, form, produce or generate in any manner whatsoever. Disclosed implementations use the average of the non-extracted pixels in the block to replace the extracted pixels; however, other algorithms to replace the extracted pixels can be used. This can also be called data re-shaping and is also described as re-shaping or re-forming the block.

Special features can include, for example, a line or texture, and can be extracted by detecting impulse (spike) or step (edge) functions in the spatial domain. Implementations can detect isolated pixels or groups of pixels that differ from the average of the pixels in the block by more than a predetermined range, for example. Other ways of detecting special features are possible, including detecting pixels or groups of pixels that differ from their neighboring pixels by a predetermined amount, for example. These detected pixels can be removed from the block and replaced by pixels having values equal to the average values of the remaining pixels, for example. Other values can be used to replace the removed pixels, for example calculations based on the values of neighboring pixels. Detecting special features and replacing the detected pixels with other values generates a second block. This can also be called feature extraction.

In certain implementations, the pixel values used for the comparison can be, for example, intensity or luma values in Y'CbCr colorspace (also called YUV colorspace). In one such implementation, when the pixels are removed and replaced, the luma value for the removed pixels can be replaced by average luma values for the remaining pixels of the block and the chroma values Cb and Cr for each removed pixel can be replaced by respective average chroma values Cb and Cr of remaining pixels of the block. This technique can be implemented before or after chroma subsampling (e.g., 4:2:0 Y'CbCr chroma subsampling), which generally results in a luma value Y' for each pixel but only one set of chroma values Cb, Cr for more than one image pixel. The actual color format is not critical or limited and can be any color format or colorspace. Other comparisons of pixel values can be made, for example, such as by comparing each of value Y', Cb and Cr to a range of values to detect whether a special feature may exist.

The second block generated in step 504 can have a lower entropy than the original, first block. At step 506, the second block is encoded using a first encoding technique, which in this case can include a DCT transform, for example, by encoder 70. Other transforms can be used as described above. Following the DCT transform, the transformed block can be quantized to reduce the number of unique states occurring in the transformed data. The transformed and quantized block data can then be entropy encoded. By removing special features from the second block and replacing the pixels with average values, for example, the number of bits in the encoded block can be reduced, thereby reducing the number of bits to be included in the encoded video bitstream for the second block at step 508. Examples of this are given below.

At step 510, a copy of the second block is decoded at the encoder. In this implementation, it is desirable that a decoded version of the second block be used rather than the original second block for further processing. This is due to the fact that the process of transforming and quantizing the original data is lossy, meaning that the decoded second block data may not equal the data of the original second block. The decoder will use the decoded version of the second block, so using the decoded version of the second block to generate the third block in the following step can maintain the accuracy of the encoded blocks without drifting.

At step 512, the decoded second block can be subtracted from the original first block to yield a third block that represents the residue or difference between the second and first blocks. An example of this subtraction is given below. In other implementations, the original second block can be used for the subtraction in step 512. At step 514, the third or residue block is encoded. Since the third or residue block contains isolated pixels, a spatial domain transformation such as pulse code modulation (PCM) or no transformation at all can result in few bits to include in the bitstream following quantization and entropy encoding. At step 516, the third block is included in the encoded video bitstream.

This process may be implemented into the bitstream syntax by specifying one of a number of quantization and coding modes in a picture layer, a segment/slice layer, a macroblock layer or a block layer where the block is smaller than the macroblock. One mode could indicate transform domain quantization and coding only, a second could indicate spatial domain quantization and coding only, and a third could indicate transform domain quantization and coding followed by spatial domain quantization and coding. The modes would be represented by bits in headers, for example.

Figure 6:
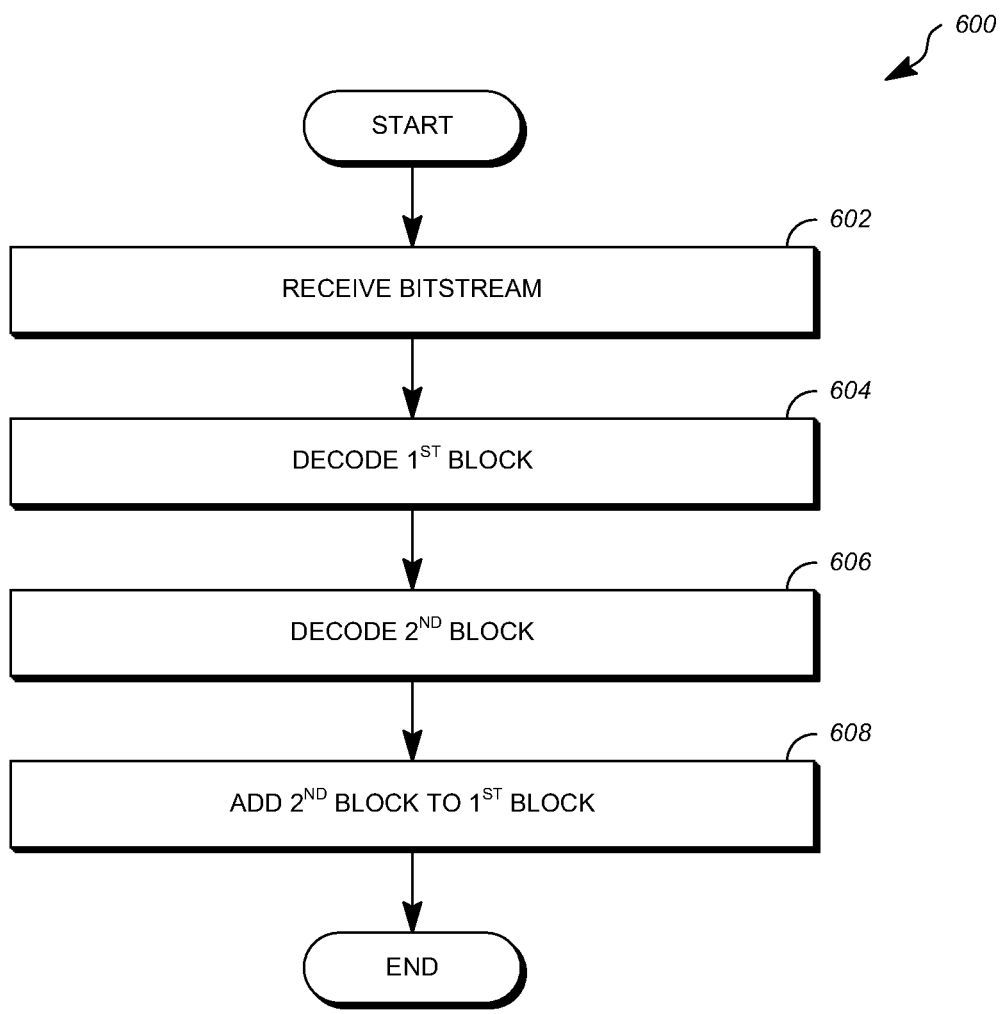
FIG. 6 is a flowchart of a process for decoding blocks encoded according to FIG. 5.

FIG. 6 is a flowchart of a process 600 for decoding blocks encoded according to FIG. 5. For simplicity of explanation, process 600 is depicted and described as a series of steps. However, steps in accordance with this disclosure can occur in various orders and/or concurrently. For example, while in FIG. 6 the first block is decoded at step 604 before the second block is decoded at step 606, it shall be appreciated that blocks may be included the bitstream in other orders and remain within the scope of this disclosure. For example, the second block may be decoded before or concurrently with the decoding of the first block. Additionally, steps in accordance with this disclosure may occur with other steps not presented and described herein. Furthermore, not all illustrated steps may be required to implement a method in accordance with the disclosed subject matter.

Process 600 can be implemented as a software program by a computing device such as receiving station 30. For example, the software program can include machine-readable instructions that are stored in memory 34 that, when executed by a processor such as CPU 32, can cause the computing device to operate on data stored in memory 34 and perform process 600. Process 600 can also be implemented using hardware. As explained above, some computing devices can have multiple memories and multiple processors, and the steps of process 600 can in such cases be distributed using different processors and memories.

At step 602, an encoded video bitstream is received by a decoder, such as decoder 100. The encoded video bitstream can be received in any number of ways, such as by receiving the video data over a network, over a cable, or by reading the video data from a primary memory or other storage device, including a disk drive or removable media such as a CF card, SD card, or the like. At step 604, process 600 decodes the first block. The first block corresponds to the second block encoded and included in the video stream in steps 506 and 508 of process 500, above. This block can be entropy decoded and dequantized. The dequantized coefficients are then inverse transformed to restore the block to the spatial domain.

At step 606, the second block, which corresponds to the third block encoded and included in the encoded video stream in steps 514 and 516 of process 500, is decoded. The second block can be entropy decoded, de-quantized and then decoded. Since the data in the second block is already in the spatial domain, transforming the data can be unnecessary. If the second data block has been pulse code modulated, the PCM can be reversed by adding successive entries. At step 608, the decoded second block and the decoded first block can be combined by adding the blocks on a pixel-by-pixel basis. Combining the blocks in this fashion can reproduce the original block in the spatial domain within the limits of errors introduced by the encoding and decoding algorithms.

Representations of different blocks of data in the spatial domain and in the transform domain are useful to show the properties of the data in the different domains and to illustrate the usefulness of the above techniques. Such representations are shown by example in FIGS. 7-10.

Figure 7:
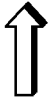
FIG. 7 is a diagram showing an 8×8 block of pixels in the spatial domain transformed into a two-dimensional matrix of transform coefficients using a DCT transform.
Figure 8:
FIG. 8 is a diagram of another example of an 8×8 block of pixels in the spatial domain transformed into a two-dimensional matrix of transform coefficients using a DCT transform.

FIG. 7 is a diagram showing an 8×8 block 702 of pixels in the spatial domain transformed into a two-dimensional matrix 704 of transform coefficients using a DCT transform. A block with a very simple representation in the spatial domain, such as an impulse or step function, can become a very complex set of coefficients in the DCT transform domain. FIG. 8 is a diagram of another example of an 8×8 block 802 of pixels in the spatial domain transformed into a two-dimensional matrix 804 of transform coefficients using a DCT transform. The shape in the spatial domain is fairly simple, but it transforms into a complex block of transform coefficients. These two examples demonstrate cases where a relatively simple, compact and easy to encode spatial domain is transformed into a complex, difficult to encode pattern in the transform domain. In such cases, encoding in the spatial domain can result in fewer bits to be included in the encoded video bitstream than would be required due to encoding in the transform domain.

Figure 9:
FIG. 9 is a diagram showing an 8×8 block of pixels in the spatial domain transformed into a two-dimensional matrix of transform coefficients using a DCT transform, where the matrix is further quantized.
Figure 9:

Certain situations may involve a complex spatial domain representation but a simple transform domain representation. FIG. 9 is a diagram of an 8×8 block 902 of pixels in the spatial domain transformed into a two-dimensional matrix 904 of transform coefficients using a DCT transform, where the matrix 904 is further quantized. This demonstrates that a spatial domain data block with a complex representation may be represented in the transform domain efficiently where the data has low frequency components. The simplicity of the transformed coefficient matrix 904 can be made clearer following quantization of transformed coefficient matrix 904 into a two-dimensional matrix 906 of quantized transform coefficients. The quantizer or quantization level in this example is 10. This matrix 906 is relatively easy to code with many zero components.

In some situations, a block of data cannot be represented in a simple manner in either the spatial domain or the transform domain. FIG. 10 is a diagram of another example of an 8×8 block 1002 of pixels in the spatial domain transformed into a two-dimensional matrix 1004 of transform coefficients using a DCT transform, where the matrix 1004 is further quantized. Both block 1002 and matrix 1004 are complex representations. Matrix 1004 is quantized using, for example, a quantizer of 32, to generate a two-dimensional matrix 1006 of quantized transform coefficients. Matrix 1006 is complex and hence hard to code, even though it is already heavily quantized and is likely to result in a large number of errors after dequantization and reconstruction.

Figure 11A:
FIGS. 11A and 11B are diagrams illustrating the process of FIG. 5.
Figure 11A:
Figure 11B:
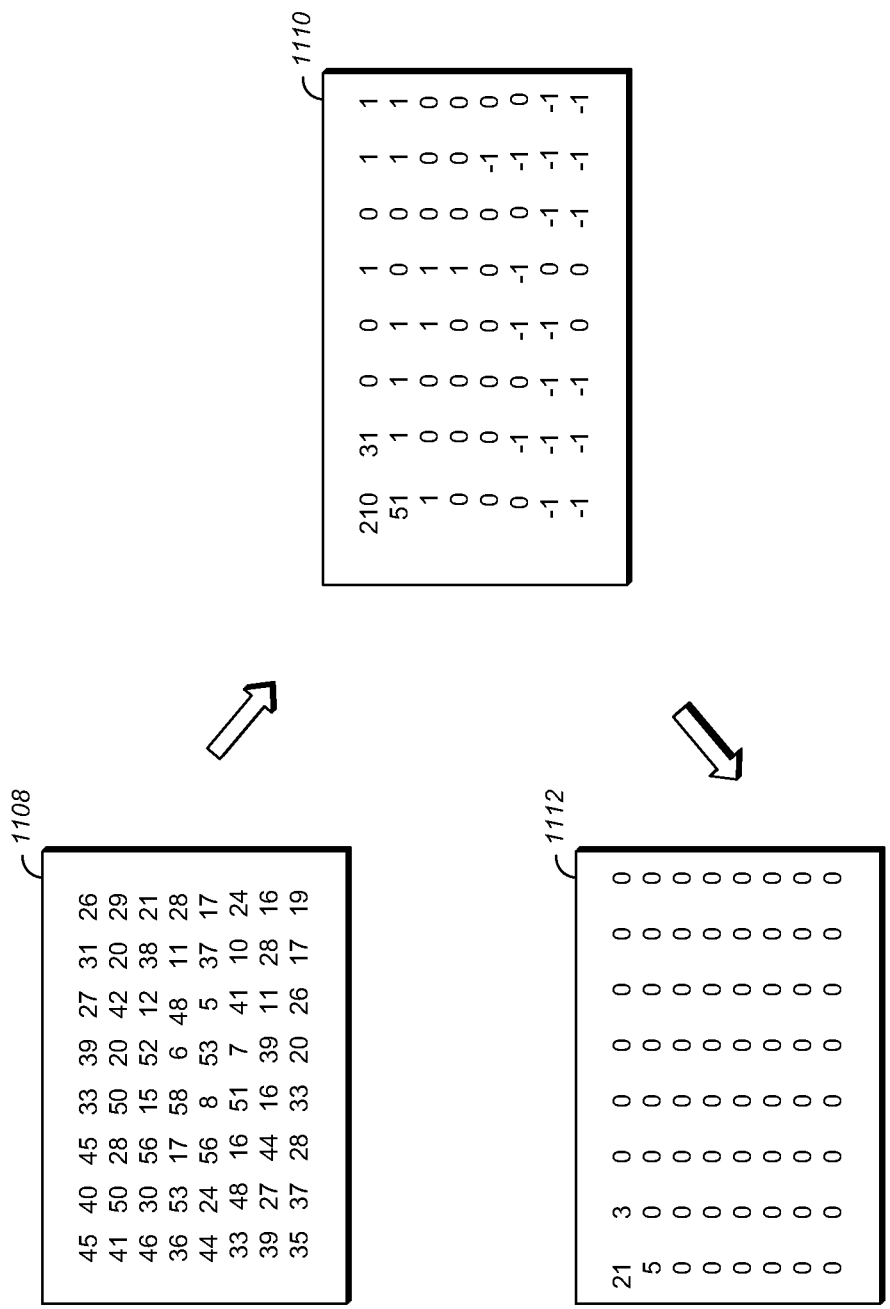

FIGS. 11A and 11B are diagrams illustrating the process of FIG. 5. As explained above, isolated high values in the spatial domain are first replaced with a predicted value from the rest of the block's pixel values. Isolated low values could also be replaced by this technique. This is called re-shaping the data block because it makes a data block or matrix with a relatively better distribution of energy than the original block so that the transformed coefficients may be represented and coded more efficiently.

FIG. 11A shows a second block 1102 that represents block 1002 of FIG. 10 re-shaped according to step 504 remove isolated data points. In this example, the average pixel value of block 1002 has been calculated as (mean2×8)=35, where mean2 is the two-dimensional average of the pixel values in block 1002. A value of 70 or less is selected as the predetermined range to identify pixels to be removed from the block. In this case, pixels having a value greater than the predetermined range are identified and replaced with the average value 35 to form block 1102. In other cases, the predetermined range can include minimum and maximum values, where pixels with values outside of a range are identified and replaced with another value. Block 1102 is encoded in step 506 by first applying a DCT transform to form a matrix 1104 of transform coefficients and then quantizing matrix 1104 into matrix 1106 using a quantizer or quantization value of 25. Despite using a smaller quantization value (25 vs. 32), block or matrix 1106 with re-shaping is clearly simpler than the originally transformed matrix 1006 without re-shaping. At this time in the process (such as shown in step 508), or later in the process, block 1106 proceeds through any remaining encoding steps (e.g. entropy encoding) and is added to compressed bitstream 88 according to known techniques.

Next, inverse quantization (i.e., dequantization) and an inverse transform can be performed on block 1106. FIG. 11B shows a block 1108, which is the decoded second block in step 510. More specifically, block 1108 is the result of reconstructing block 1102 by dequantizing the quantized transform coefficients of block 1106 using the quantization value of 25 and then performing an inverse DCT transformation on the resulting transform coefficients. Note that the pixel values of reconstructed second block 1108 do not exactly match second block 1102. This is, as mentioned above, due to the lossy compression. In step 512, reconstructed block 1108 is subtracted pixel-by-pixel from original block 1002 to form a difference block 1110, which corresponds to the third block. Block 1110 is then encoded in step 514 by first being subject to quantization using a quantizer, here 10 by example, to form a matrix or block 1112 of quantized coefficients. Block 1112 is a compact, easy to code matrix in the spatial domain. Block 1112 can be entropy encoded and then included in compressed bitstream 88 according to known techniques. The sum of the bits used to encode second block 1106 and third block 1112 is less that the number of bits required to encode first block 1002, thereby saving bits in the encoded video bitstream.

In the implementations described above, a video stream can be encoded in a two-step process that identifies pixels in a block having selected spatial properties, for example isolated pixels with values that exceed the values of neighboring pixels by more than an amount. The identified pixels are replaced in the block with, for example, pixels set to the average value of the block. The block is then transformed using a lossy transform and a copy of the transformed block is inverse transformed. Transforms used by disclosed implementations are invertible transformations that can transform the pixels of a block into a transform domain wherein the transformed pixels of the block can be inverse transformed to reform the original pixels. Lossy transforms are invertible transforms which, upon transform/inverse transforming yield a block with pixels whose values are close to, but possibly not exactly matching, the original pixel values.

The pixels of the inverse transformed copy of the block is subtracted from the pixels of the original block to form a residue block that contains the pixels identified as having preselected spatial properties. The inverse transformed block can be subtracted from the original data rather than using the re-shaped block because this may more closely reflect the pixel values available to the decoder when the blocks are decoded and thereby yield more accurate results.

The residue block and the transformed block can be further encoded by quantizing the pixel data to reduce the number of discrete states used to represent the data. The blocks can be entropy encoded to reduce redundant data and then included in the encoded video bitstream for transmission or storage. Encoding video data in this two-step fashion can permit the two encoded blocks to be represented by fewer bits in the bitstream than blocks encoded using a single step process, thereby saving transmission bandwidth or storage space while maintaining equivalent video quality.

The implementations of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of transmitting station 12 and/or receiving station 30 (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 12 and receiving station 30 do not necessarily have to be implemented in the same manner.

Further, in one implementation, for example, transmitting station 12 or receiving station 30 can be implemented using a general purpose computer/processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 12 and receiving station 30 can, for example, be implemented on computers in a video conferencing system. Alternatively, transmitting station 12 can be implemented on a server and receiving station 30 can be implemented on a device separate from the server, such as a hand-held communications device (e.g., a cell phone). In this instance, transmitting station 12 can encode content using an encoder into an encoded video signal and transmit the encoded video signal to the communications device. In turn, the communications device can then decode the encoded video signal using a decoder. Alternatively, the communications device can decode content stored locally on the communications device, for example, content that was not transmitted by transmitting station 12. Other suitable transmitting station 12 and receiving station 30 implementation schemes are available. For example, receiving station 30 can be a generally stationary personal computer rather than a portable communications device and/or a device including an encoder may also include a decoder.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic or semiconductor device. Other suitable mediums are also available.

The above-described implementations have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method of encoding a frame in a video stream, the frame having a plurality of blocks, the method comprising:
   identifying a first block of the plurality of blocks;
   generating a second block from the first block by copying pixels from the first block to the second block while replacing each pixel value within the second block that is outside of a defined value range with a pixel value within the defined value range such that the second block has a lower entropy than the first block;
   encoding the second block using a first encoding technique, wherein the first encoding technique includes:
      transforming the second block; and
      quantizing the second block using a first quantizer value after transforming the second block;
   decoding the encoded second block using a processor;
   generating a third data block based on a difference between the decoded second block and the first data block; and
   encoding the third data block using a second encoding technique different from the first encoding technique, including quantizing the third block using a second quantizer value different than the first quantizer value.

2. The method of claim 1, further comprising:
   generating an encoded video bitstream including the encoded second data block and the encoded third data block.

3. The method of claim 1 wherein encoding the third block using the second encoding technique comprises:
   quantizing the third block without transforming the third block.

4. The method of claim 3 wherein encoding the second block comprises entropy encoding the second block after quantizing the second block and encoding the third block comprises encoding the third block after quantizing the third block.

5. The method of claim 1 wherein replacing each pixel value comprises:
   identifying one or more pixels within the second block having pixel values outside of the defined value range;
   determining the pixel value that is within the defined value range; and
   replacing the one or more pixels having pixel values outside of the defined value range with the pixel value.

6. The method of claim 5 wherein determining the pixel value comprises:
   calculating an average of pixel values of the pixels copied from the first block copied to the second block.

7. The method of claim 1 wherein generating the third data block comprises:
   performing a pixel-by-pixel subtraction of pixel values of the decoded second block from pixel values of the first block.

8. The apparatus of claim 1, wherein decoding the encoded second block includes inverse transforming the second encoded block.

9. A method for decoding a frame of an encoded video bitstream including a plurality of encoded blocks and the frame having a plurality of blocks, the method comprising:
   receiving a first encoded block and a second encoded block of the plurality of encoded blocks, the first encoded block corresponding to a first block having a plurality of pixels with first pixel values that is encoded, and the second encoded block corresponding to a second block having a plurality of pixels with the first pixel values except that those of the first pixel values outside of a defined value range are replaced with a pixel value within the defined value range;
   decoding the first encoded block using a first decoding technique to generate a first decoded block, wherein decoding the first encoded block includes:
      dequantizing the first block using a first quantizer value; and
      inverse transforming the first encoded block after dequantizing the first encoded block;
   decoding the second encoded block using a second decoding technique different from the first decoding technique to generate a second decoded block, the second decoded block having a lower entropy than the first decoded block, wherein decoding the second encoded block includes:
      dequantizing the second block with a second quantizer value different than the first quantizer value; and
      inverse transforming the second encoded block after dequantizing the direct encoded block; and
   combining the first decoded block with the second decoded block to form a block of the plurality of blocks using a processor.

10. The method of claim 9 wherein decoding the first encoded block using the first decoding technique comprises:
    entropy decoding the first encoded block before dequantizing the first encoded block.

11. The method of claim 10 wherein decoding the second encoded block using the second decoding technique comprises:
    dequantizing the second encoded block without inverse transforming the second encoded block.

12. The method of claim 9 wherein decoding the second encoded block using the second decoding technique comprises:
    dequantizing the second encoded block without inverse transforming the second encoded block.

13. The method of claim 9 wherein combining the first decoded block with the second decoded block comprises:
    performing a pixel-by-pixel addition of pixel values of the first decoded block and pixel values of the second decoded block.

14. An apparatus for encoding a frame in a video stream, the frame having a plurality of blocks, the apparatus comprising:
    a memory; and
    a processor configured to execute instructions stored in the memory to:
    identify a first block of the plurality of blocks;
       generate a second block from the first block by copying pixels from the first block to the second block while replacing each pixel value within the second block that is above a defined value with a single pixel value below the defined value such that the second block has a lower entropy than the first block;
       encode the second block using a first encoding technique, wherein the first encoding technique includes:
          transforming the second block; and
          quantizing the second block using a first quantizer value after transforming the second block; and
       decode the encoded second block;
       generate a third data block based on a difference between the decoded second block and the first data block; and
       encode the third data block using a second encoding technique different from the first encoding technique wherein the first encoding technique includes quantizing the third block using a second quantizer value different than the first quantizer value.

15. The apparatus of claim 14 wherein the processor is configured to:

generate an encoded video bitstream including the encoded second block and the encoded third block, the encoded video bitstream including a coding mode indicating the first coding technique and the second encoding technique.

16. The apparatus of claim 14 wherein the processor is configured to encode the second block by:

entropy encoding the second block after quantizing the second block; and wherein the processor is configured to encoding the third block by:

entropy encoding the third block after quantizing the third block.

17. The apparatus of claim 16 wherein the processor is configured to transform the second block by applying a DCT transform of the second block.

18. The apparatus of claim 14 wherein the defined value is based on at least some of the pixel values of the first block.

\* \* \* \* \*